United States Patent [19]

Lin

[11] Patent Number: 5,524,664

[45] Date of Patent: Jun. 11, 1996

[54] COUPLING DEVICE

[76] Inventor: Richard Lin, 5, Alley 14, Lane 298, Shin Min Rd., Nei Hu, Taipei, Taiwan

[21] Appl. No.: 447,222

[22] Filed: May 22, 1995

[51] Int. Cl.⁶ ..................................................... F10L 29/02
[52] U.S. Cl. ........................................ 137/75; 251/149.4
[58] Field of Search .......................... 251/149.4; 137/74, 137/75

[56] References Cited

U.S. PATENT DOCUMENTS

| 3,245,423 | 4/1966 | Hansen et al. | 137/75 |
| 3,730,205 | 5/1973 | Guimbellot | 137/75 |
| 5,027,845 | 7/1991 | Silagy | 137/74 |

*Primary Examiner*—John C. Fox

*Attorney, Agent, or Firm*—Morton J. Rosenberg; David I. Klein

[57] ABSTRACT

A coupling device including a tubular member, a locking member engaged with the tubular member, a sleeve made of polymer which will become soft at at temperature between 240-300 degrees F. and fitted within the tubular member, a spindle engaged with the tubular member with its coupling nose fitted into the sleeve, an inner seat formed at an end with a concave recess adapted to receive the spherical surface of the spindle and at another end with a cylindrical opening coaxial with the concave recess and adapted to receive the cylindrical head of the spindle, an outer seat put over the inner seat and adapted to engage with a cylinder valve, and a plug fitted on the spindle, whereby the coupling device will automatically shut off the gas flow passage in the event that the temperature exceeds a safety standard.

7 Claims, 4 Drawing Sheets

COUPLING DEVICE

BACKGROUND OF THE INVENTION

1. Field of the Invention

This invention relates to an improved coupling device for a LPG cylinder valve.

2. Description of the Prior Art

It has been found that liquid petroleum gas is widely utilized in ordinary households and the need for safety is strongly desired. However, the conventional coupling devices are only designed for connection purpose and does not have any other function. Furthermore, the conventional safety regulators can only used to shut off gas flow in the pipeline during gas overflow. Hence, in the event that the temperature exceeds a safety standard, such regulators will be of no use to prevent disasters.

Therefore, it is an object of the present invention to provide a coupling device which can obviate and mitigate the above-mentioned drawbacks.

SUMMARY OF THE INVENTION

This invention relates to a coupling device.

It is the primary object of the present invention to provide a coupling device which can automatically shut off the gas flow passage in the event that the temperature exceeds a predetermined standard.

It is another object of the present invention to provide a coupling device for automatically shutting the gas pipeline passage off while the gas leaks and overflows.

It is still another object of the present invention to provide a coupling device which can prevent disasters from taking place.

It is still another object of the present invention to provide a coupling device which is convenient and reliable in use.

It is a further object of the present invention to provide a coupling device which is easy and cheap to manufacture.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE PREFERRED EMBODIMENT

DETAILED DESCRIPTION OF THE PREFERRED EMBODIMENT

Figure 1:
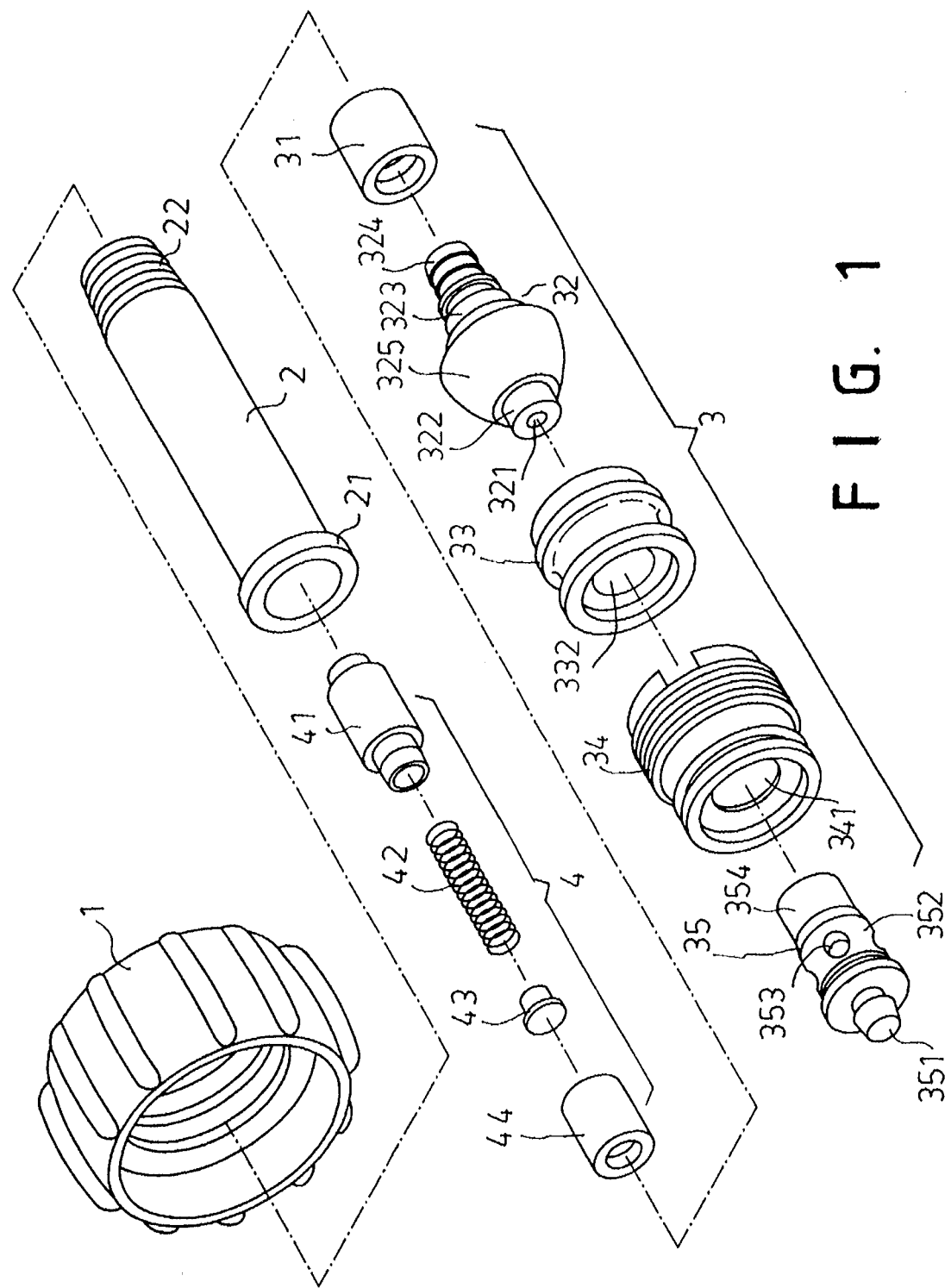
FIG. 1 is an exploded view of a coupling device according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
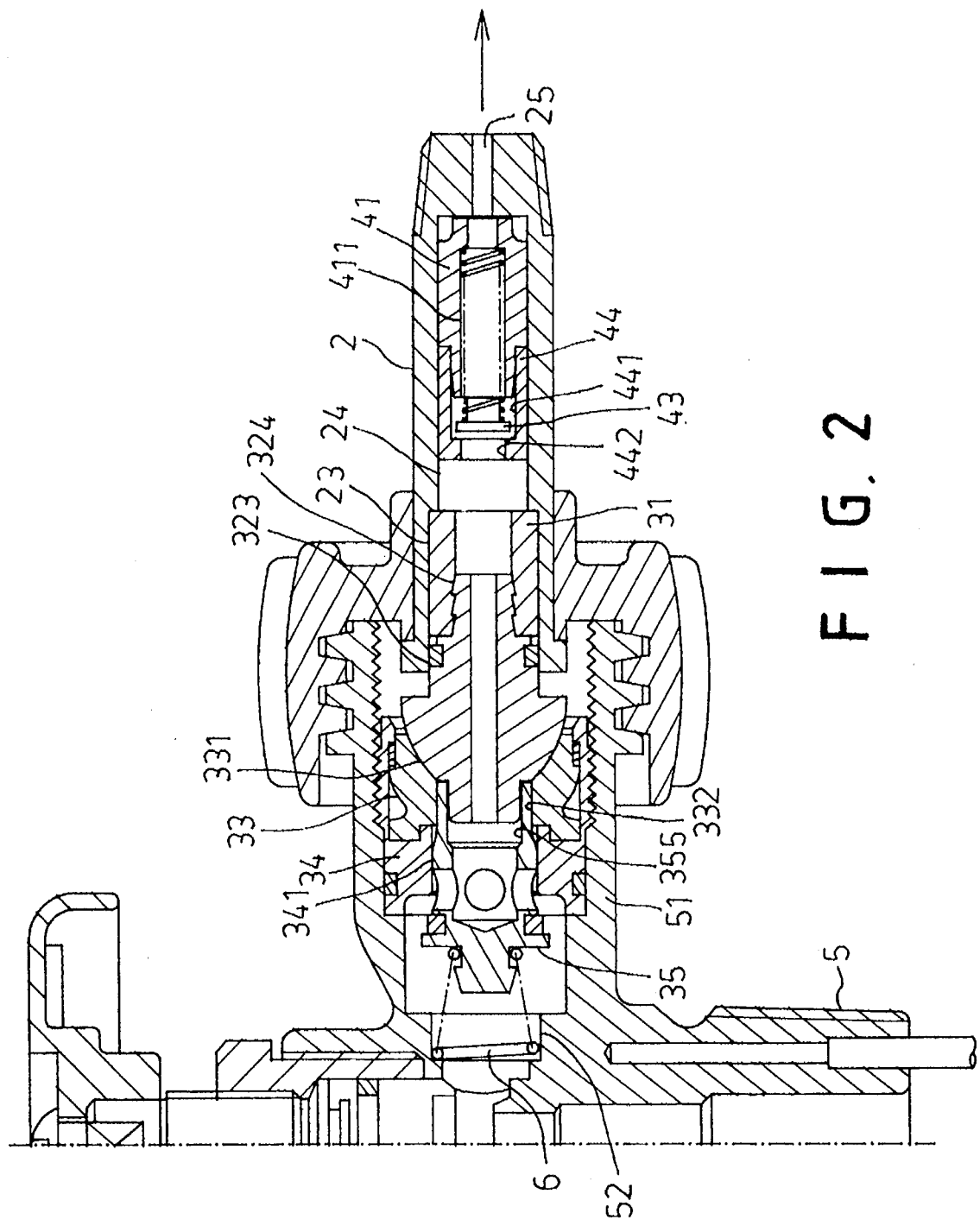
FIG. 2 is a sectional view of the coupling device.

With reference to the drawings and in particular to FIGS. 1 and 2 thereof, the coupling device according to the present invention consists of such major components as a locking member 1, a tubular member 2, a thermal shut-off device 3, and a flow limit device 4.

The tubular member 2 has a flange 21 at one end and a threaded portion 22 at the other. Further, the tubular member 2 is formed with a first opening 23, a second opening 24 coaxial with and smaller than the first opening 23 in diameter, and a third opening 25 coaxial with and smaller than the second opening 24 in diameter.

The locking member 1 is fitted over the tubular member 2 and is prevented from disengaging therefrom by the flange 21 of the tubular member 2.

The thermal shut-off device 3 includes a sleeve 31, a spindle 32, an inner seat 33, an outer seat 34, and a plug 35.

The sleeve 31 is made of thermoplastic material such as polymer which will become soft at a temperature between 240–300 degree F. The sleeve 31 is fitted within the tubular member 2.

The spindle 32 is formed with a cylindrical head 322 at one end, a coupling nose 324 at the other end, a spherical surface 325 at the intermediate portion, a cylindrical shoulder 323 between the spherical surface 32 and the coupling nose 324, and an axial passage 321. The spindle 32 is connected with the tubular member 2, with its cylindrical shoulder 323 engaged with the first opening 25 of the tubular member 2 and its coupling nose 324 fitted into the sleeve 31.

The inner seat 33 is formed with a concave recess 331 located at one end and a cylindrical opening 332 located the other end and coaxial with the concave recess 331. The inner seat 33 is fitted over the spindle 32, with its concave recess 331 engaged with the spherical surface 32 and its cylindrical opening 332 receiving the cylindrical head 322. Further, the inner seat 33 is preferably made of deformable material such as rubber or the like.

The outer seat 34 is arranged within an outlet 51 of a cylinder valve 5. The inner seat 33 is disposed within the outer seat 34. Further, the outer seat 34 is formed with an axial opening 341 for receiving a plug 35.

The plug 35 is formed with a protuberance 351 at one end, a curved recess 352 at the intermediate portion, and a tubular portion 354 at the other end. The curved recess 352 has two radial through holes 353 which go across each other. The tubular portion 354 has a longitudinal opening 355 for receiving the cylindrical head 322 of the spindle 32. A spring 6 is mounted between an outlet 52 and the protuberance 351 of the plug 35.

The flow limit device 4 includes a cylindrical member 41, a spring 42, a cap 43, and a ferrule 44.

The cylindrical member 41 is formed with a longitudinal passage 411. The cylindrical member 41 is fitted within the tubular member 2, with its longitudinal passage 411 aligned with the center line of the third opening 25 of the tubular member 2.

The spring is disposed within the longitudinal passage 411 of the cylindrical member 41.

The cap 43 is mounted on the other end of the spring 42.

The ferrule 44 is formed with a first longitudinal hole 441 and a second longitudinal hole 442 which is smaller than the first longitudinal hole 441 and the cap 43 in diameter. The ferrule 44 is snugly fitted on an end of the cylindrical member 41, with its first longitudinal hole 441 receiving the cap 43.

Figure 3:
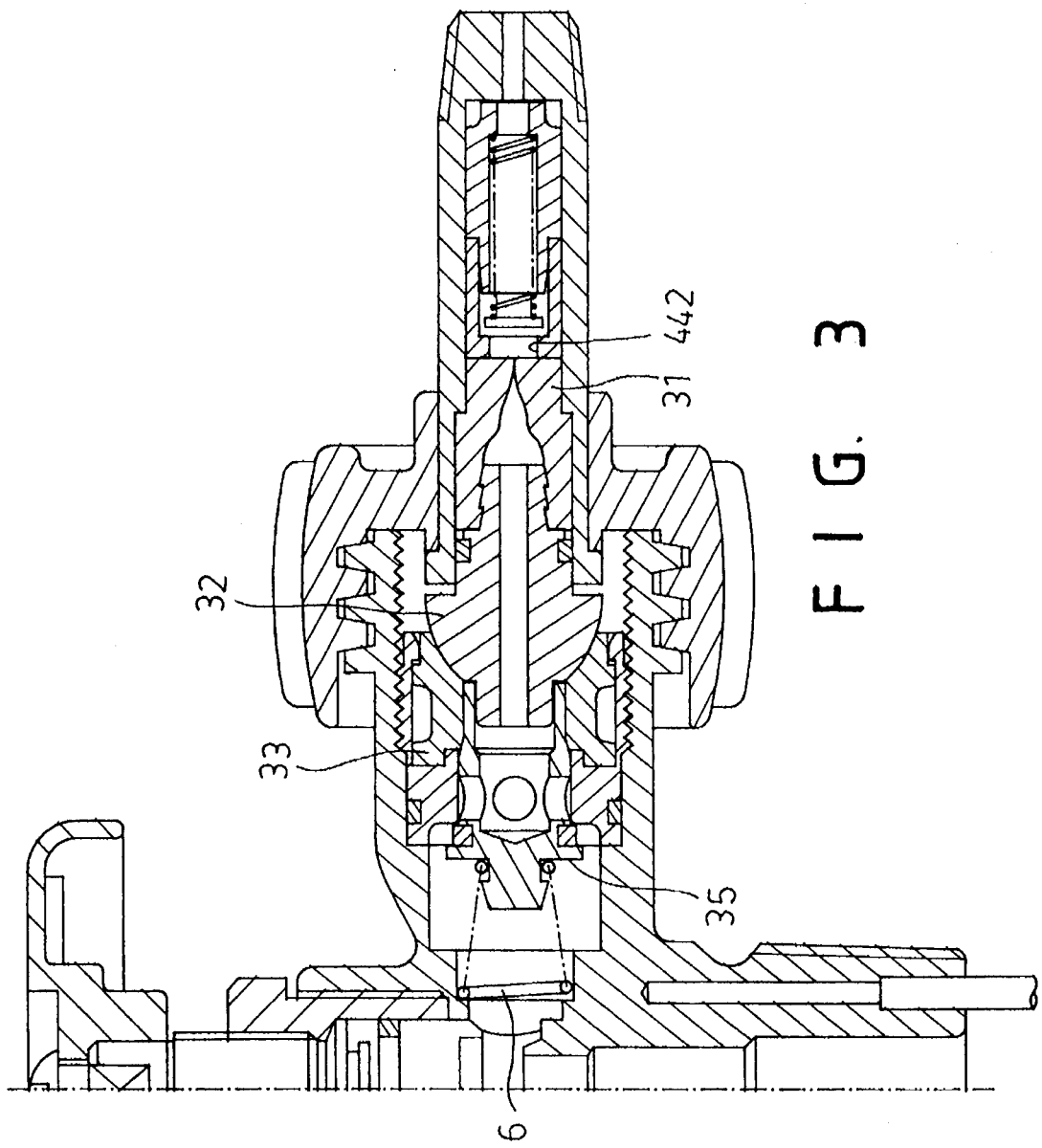
FIG. 3 illustrates how the coupling device shuts off the gas flow passage in the event that the temperature exceeds a predetermined standard.

When the temperature rises to a level above 240 degrees F. in case of fire accident or the like, the sleeve 31 will become soft and the spring 6 will urge the plug 35 which will in turn push the valve 32 against the sleeve 31 thereby sealing the passage for the gas flow from the cylinder valve 6 (see FIGS. 2 and 3).

Figure 4:
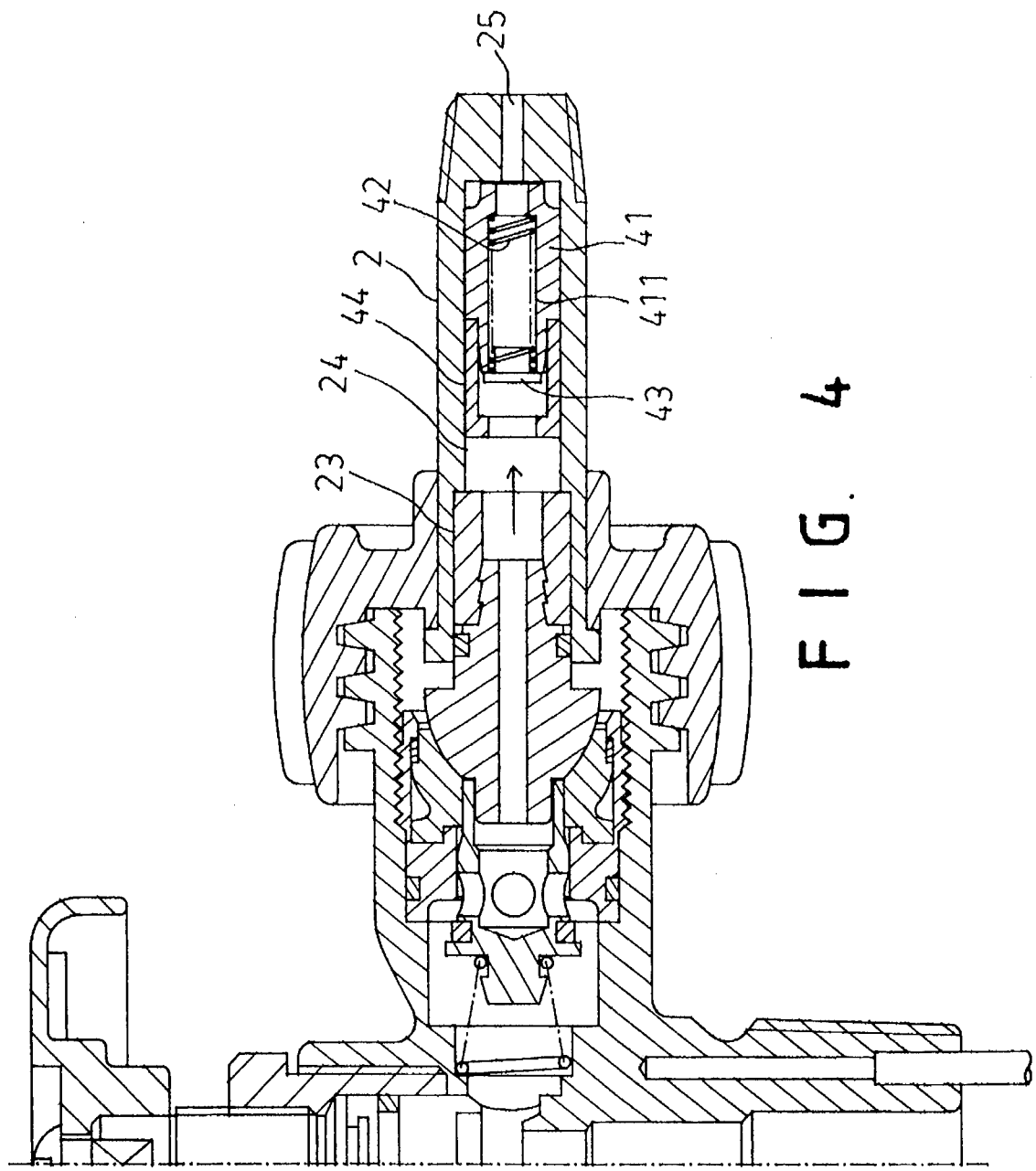
FIG. 4 illustrates how the coupling device shuts off the gas flow passage while the gas leaks or overflows.

As the pressure in the coupling device increases to a level above the predetermined pressure, the high pressure gas forms a rightward (see FIG. 4) pushing force against the cap 43 to close the passage 411 of the cylindrical member 41 hence shutting off the gas supply.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A coupling device comprising:
    a thermal shut-off device, including:
        a tubular member;
        a sleeve made of polymer which will become soft at a temperature between 240–300 degrees F. and fitted within said tubular member;
        a spindle formed with an axial passage, a head at an end, and a coupling nose at another end, said spindle being engaged with said tubular member with the coupling nose fitted into said sleeve;
        an inner seat adapted to receive the head of said spindle;
        an outer seat put over said inner seat and adapted to engage with a cylinder valve, said outer seat having an axial opening; and
        a plug fitted in said outer seat and connected with the head of said spindle; and
    a locking member engaged with said tubular member.

2. The coupling device as claimed in claim 1, wherein said spindle head is a cylindrical head, a spherical surface intermediate said cylindrical head and said coupling nose, a cylindrical shoulder between the cylindrical head and said spherical surface, said inner seat being formed at an end with a concave recess adapted to receive the spherical surface of said spindle and at another end with a cylindrical opening coaxial with said concave recess and adapted to receive the cylindrical head of said spindle.

3. The coupling device as claimed in claim 1, wherein said plug is formed with a protuberance at an end, a curved recess at an intermediate portion, and a tubular portion at another end, said plug being fitted in said outer seat with the tubular portion receiving the head of said spindle.

4. The coupling device as claimed in claim 1, further comprising a cylindrical member fitted within said tubular member and formed with a longitudinal passage, a spring disposed within the longitudinal hole of said tubular member, a cap mounted on said spring, and a ferrule having a first longitudinal hole and a second longitudinal hole, said first longitudinal hole being engaged with said cylindrical member, said second longitudinal hole being smaller than said first longitudinal hole and said cap in diameter thereby preventing said cap to go out thereof.

5. The coupling device as claimed in claim 1, wherein said inner seat is made of deformable material.

6. The coupling device as claimed in claim 1, wherein said sleeve is made of thermoplastic material.

7. The coupling device as claimed in claim 1, wherein said tubular member has a flange at an end, a threaded portion at another end, a first opening, a second opening coaxial with and smaller than the first opening in diameter, and a third opening axial with and smaller than the second opening in diameter.

* * * * *